United States Patent
Fang

(10) Patent No.: US 9,423,855 B2
(45) Date of Patent: Aug. 23, 2016

(54) ELECTRONIC APPARATUS WITH WRITE-PROTECTION FUNCTIONALITY

(71) Applicants: Inventec (Pudong) Technology Corporation, Shanghai (CN); INVENTEC CORPORATION, Taipei (TW)

(72) Inventor: Lanlan Fang, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 205 days.

(21) Appl. No.: 14/206,958

(22) Filed: Mar. 12, 2014

(65) Prior Publication Data
US 2015/0149791 A1  May 28, 2015

(30) Foreign Application Priority Data
Nov. 26, 2013  (CN) .......................... 2013 1 0610762

(51) Int. Cl.
*G06F 1/28*  (2006.01)
*G06F 1/32*  (2006.01)

(52) U.S. Cl.
CPC ..................................... *G06F 1/3206* (2013.01)

(58) Field of Classification Search
CPC ................................ G06F 12/1416; G06F 1/28
See application file for complete search history.

(56) References Cited

U.S. PATENT DOCUMENTS

| | | | | |
|---|---|---|---|---|
| 5,963,142 A  * | 10/1999 | Zinsky | ................ | G06F 12/1433 340/5.74 |
| 8,909,852 B1 * | 12/2014 | Kim | .................... | G06F 12/1416 711/103 |
| 2008/0126675 A1* | 5/2008 | Fu | ........................ | G06F 12/1425 711/103 |
| 2011/0023031 A1* | 1/2011 | Bonola | ..................... | G06F 8/61 718/1 |
| 2012/0110245 A1* | 5/2012 | Wu | ........................ | G11C 5/143 711/103 |

* cited by examiner

*Primary Examiner* — Thomas Lee
*Assistant Examiner* — Chad Erdman
(74) *Attorney, Agent, or Firm* — Maschoff Brennan

(57) ABSTRACT

An electronic apparatus includes a chip, a memory and a switch unit. The chip works in a boot state. The memory coupled to the chip stores firmware and has a write-protection control end connected to the chip through a write-protection control path. In a standby state, when receiving an electric potential signal through the write-protection control end, the memory disables a write-protection function, so as to update the firmware. The switch unit is located on the write-protection control path and is controlled by a power-on signal related to the boot state. In the standby state, the switch unit is turned-off and the delivery of the electric potential signal to the chip through the write-protection control path is disabled. In the boot state, the switch unit is turned-on and the write-protection control way is conducted by the power-on signal so that the chip controls the write-protection function.

7 Claims, 1 Drawing Sheet

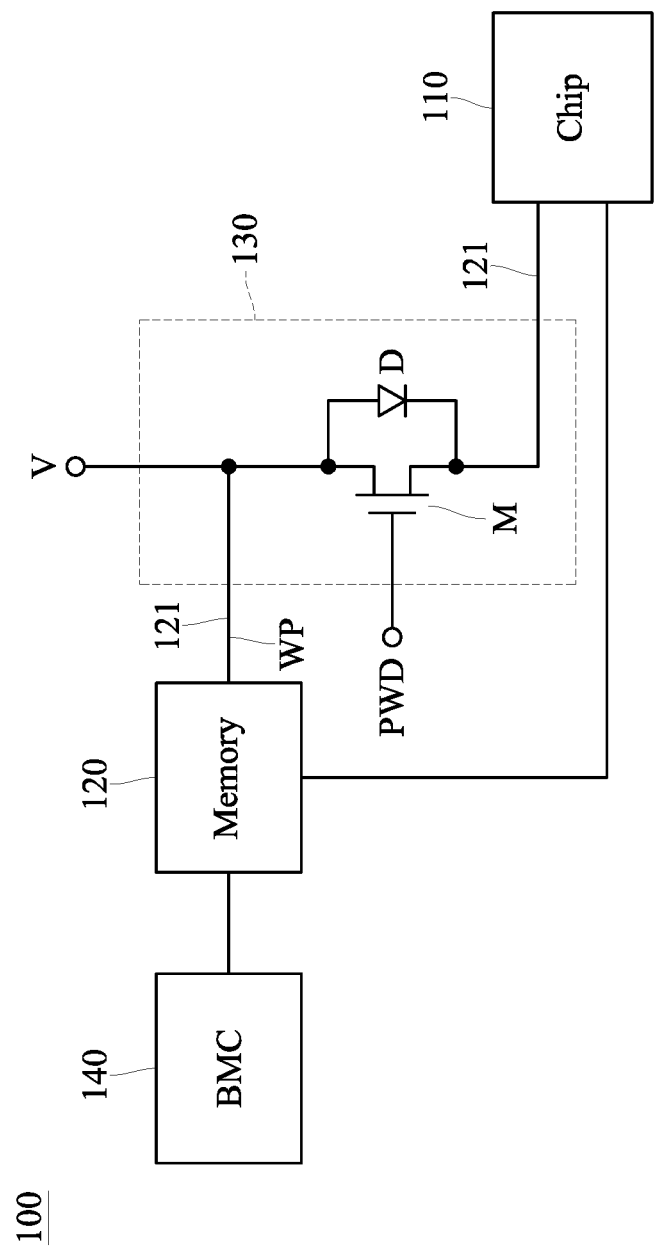

ELECTRONIC APPARATUS WITH WRITE-PROTECTION FUNCTIONALITY

CROSS-REFERENCE TO RELATED APPLICATIONS

This non-provisional application claims priority under 35 U.S.C. §119(e) on Patent Application No(s). 201310610762.9 filed in China on Nov. 26, 2013, the entire contents of which are hereby incorporated by reference.

BACKGROUND OF THE INVENTION

1. Technical Field of the Invention

This disclosure relates to an electronic apparatus, and more particularly to an electronic apparatus with write-protection function and electric leakage prevention.

2. Description of the Related Art

Generally, in the current design of the server based on the advanced RISC machine (ARM) structure, the expander may be coupled to the serial peripheral interface read only memory (SPI ROM). In the design described above, only under the AC state the server can burn the SPI ROM through the integrated lights-out (ILO) technology, and the SPI ROM needs to function under the voltage of P3V3_STBY.

Since the SPI ROM has to function under the voltage of P3V3_STBY, its write-protection pin is supplied with the voltage of P3V3_STBY and whereby the SPI ROM can be burnt when the server is functioning under the AC state. However, since the write-protection pin is supplied with the voltage of P3V3_STBY, error operation may occur in the expander as the voltage of P3V3_STBY may be leaked to the expander.

SUMMARY OF THE INVENTION

The present disclosure provides an electronic apparatus with a standby mode and a power-on mode. The electronic apparatus comprises a chip, a memory, and a switch unit. The chip functions under the power-on mode. The memory is coupled to the chip and stores firmware. The chip operates according to the firmware. The memory has a write-protection control terminal, which connects with the chip through a write-protection control path. The memory, under the standby mode, is inputted an electric potential signal through the write-protection control terminal and turns off a write-protection function to update the firmware. The switch unit is located on the write-protection control path and is controlled by a power-on signal related to the power-on mode. When the electronic apparatus operates under the standby mode, the switch unit is off and the delivery of the electric potential signal to the chip through the write-protection control path is disabled. When the electronic apparatus operates under the power-on mode, the power-on signal enables the switch unit to be on, and the write-protection control path is conducted. The input of the electric potential signal is then invalid, and the chip controls the write-protection function of the memory.

According to an embodiment, the electronic apparatus described above further comprises a baseboard management controller (BMC). The baseboard management controller is coupled to the memory, for burning the memory.

According to an embodiment, when the electronic apparatus described above is under the standby mode, the electric potential signal is pulled up by using a standby voltage corresponding to the standby mode and is delivered to the memory, so as to enable the write-protection function of the memory; and when the electronic apparatus described above is under the power-on mode, the chip receives a power-on voltage and the electric potential signal is pulled up by using the power-on voltage and is delivered to the memory, so as to enable the write-protection function of the memory.

According to an embodiment, the switch unit described above is a transistor. The source and the drain of the transistor are respectively coupled to the chip and the memory. The gate of the transistor is used for receiving the power-on signal.

According to an embodiment, when the electronic apparatus described above operates under the standby mode, the power-on signal is in a low-voltage state and the switch unit breaks off the connection between the memory and the chip accordingly.

According to an embodiment, when the electronic apparatus operates under the power-on mode, the power-on signal is in a high-voltage state, and the switch unit is on to connect the memory with the chip so that the memory and the chip can communicate normally.

According to an embodiment, the power-on signal described above is a power-good signal.

According to an embodiment, the memory is a SPI ROM.

BRIEF DESCRIPTION OF THE DRAWINGS

FIG. 1 is a schematic diagram of a part of an electronic apparatus of the disclosure.

DETAILED DESCRIPTION

Referring to FIG. 1, FIG. 1 is a schematic diagram of a part of an electronic apparatus of the disclosure. The electronic apparatus 100 of the embodiment has a standby mode and a power-on mode. The electronic apparatus 100 comprises a chip 110, a memory 120, and a switch unit 130. The chip 110 operates under the power-on mode.

The memory 120 is coupled to the chip 110 and stores firmware, wherein the chip 110 operates according to the firmware to carry out a function. Furthermore, the memory 120 has a write-protection control terminal WP. The write-protection control terminal WP connects with the chip 110 through a write-protection control path 121.

For example, when receiving an electric potential signal through the write-protection control terminal under the standby mode, the memory turns off a write-protection function to update the firmware. In this embodiment, the memory 120 may be a SPI ROM.

The switch unit 130 is located on the write-protection control path, that is, the switch unit 130 is coupled between the chip 110 and the memory 120. Furthermore, the switch unit 130 may be controlled by a power-on signal PWD related to the power-on mode. In this embodiment, the power-on signal PWD may be a power-good signal.

When the electronic apparatus 100 operates under the standby mode, the switch unit 130 is off and the delivery of the electric potential signal V to the chip 110 through the write-protection control path 121 is disabled. Thus, the chip 110 can be prevented from the effect of the electric potential signal V. On the other hand, when the electronic apparatus 100 operates under the power-on mode, the power-on signal PWD enables the switch unit 130 to be on, the write-protection control path 121 is conducted so that the input of the electric potential signal V is invalid. Then, the chip 110 and the memory 120 are directly connected to enable the chip 110 to control the write-protection function of the memory 120.

In the embodiment, during the standby mode for the electronic apparatus 100, the electric potential signal V is pulled up by using a standby voltage corresponding to the standby mode and is delivered to the memory 120, so as to enable the write-protection function of the memory 120. On the other hand, during the power-on mode for the electronic apparatus 100, the chip 110 receives a power-on voltage. The electric potential signal V is then pulled up by using the power-on voltage and is delivered to the memory 120, so as to enable the write-protection function of the memory 120.

More specifically, the switch unit 130 described above may be a transistor. The source and the drain of the transistor are respectively coupled to the chip 110 and the memory 120, and the gate of the transistor is used for receiving the power-on signal PWD.

For example, when the electronic apparatus 100 operates under the standby mode, the power-on signal PWD received by the gate of the switch unit 130 may be in a low-voltage state. The switch unit 130 then breaks off the connection between the memory 120 and the chip 110 accordingly.

In contrast with the above, when the electronic apparatus 100 operates under the power-on mode, the power-on signal PWD may be in a high-voltage state. Since the gate of the transistor receives the power-on signal PWD of the high-voltage state, the switch unit 130 connects the memory 120 to the chip 110 so that the memory 120 and the chip 110 can communicate normally.

Furthermore, the switch unit 130 also includes a diode D. The diode D has an anode and a cathode. The cathode and anode of the diode D is respectively coupled to the source and the drain of the transistor, wherein the diode D is used for stabilizing the voltage between the source and the drain of the transistor.

The electronic apparatus 100 further comprises a baseboard management controller 140. The baseboard management controller 140 is used for burning the memory 120. Therefore, with the configuration of components described above, the problem in prior art, electric leakage of P3V3_STBY voltage, may be prevented.

In the electronic apparatus disclosed in the present disclosure, when the electronic apparatus operates under the standby mode, the switch unit is off and the delivery of the electric potential signal to the chip through the write-protection control path is disabled. Alternately, when the electronic apparatus operates under the power-on mode, the power-on signal enables the switch unit to be on and the write-protection control path is conducted. The input of the electric potential signal is then invalid, and the chip controls the write-protection function of the memory. Also, when under the standby mode an electric potential signal is inputted to the memory through the write-protection control terminal, and the memory turns off a write-protection function to update the firmware. Thus, the write-protection function of the memory may be preserved and meanwhile the electric leakage may be prevented.

What is claimed is:

1. An electronic apparatus with a standby mode and a power-on mode, comprising:
    a chip, functioning under the power-on mode;
    a memory, coupled to the chip and storing firmware, wherein the chip operates according to the firmware, the memory has a write-protection control terminal, the write-protection control terminal connects with the chip through a write-protection control path, and when receiving an electric potential signal through the write-protection control terminal under the standby mode, the memory turns off a write-protection function to update the firmware; and
    a switch unit, located on the write-protection control path and configured to be controlled by a power-on signal related to the power-on mode, wherein the switch unit is a transistor, a source and a drain of the transistor are respectively coupled to the chip and the memory, and a gate of the transistor is used for receiving the power-on signal,
    wherein when the electronic apparatus operates under the standby mode, the switch unit is off and the delivery of the electric potential signal to the chip through the write-protection control path is disabled; when the electronic apparatus operates under the power-on mode, the power-on signal enables the switch unit to be on, the write-protection control path is conducted, the input of the electric potential signal is invalid, and the chip controls the write-protection function of the memory.

2. The electronic apparatus according to claim 1, further comprising:
    a baseboard management controller, coupled to the memory, and configured to burn the firmware to the memory.

3. The electronic apparatus according to claim 1, wherein during the standby mode, the electric potential signal is pulled up by using a standby voltage corresponding to the standby mode and is delivered to the memory, so as to enable the write-protection function of the memory; and during the power-on mode, the chip receives a power-on voltage, the electric potential signal is pulled up by using the power-on voltage and is delivered to the memory, so as to enable the write-protection function of the memory.

4. The electronic apparatus according to claim 1, wherein when the electronic apparatus operates under the standby mode, the power-on signal is in a low-voltage state, and the switch unit breaks off the connection between the memory and the chip accordingly.

5. The electronic apparatus according to claim 1, wherein when the electronic apparatus operates under the power-on mode, the power-on signal is in a high-voltage state, and the switch unit connects the memory to the chip.

6. The electronic apparatus according to claim 1, wherein the power-on signal is a power-good signal.

7. The electronic apparatus according to claim 1, wherein the memory is a serial peripheral interface read-only memory.

* * * * *